US012186877B2

(12) United States Patent
Larsen

(10) Patent No.: US 12,186,877 B2
(45) **Date of Patent: *Jan. 7, 2025**

(54) POWER TOOL INCLUDING INPUT CONTROL DEVICE ON TOP PORTION OF HOUSING

(71) Applicant: MILWAUKEE ELECTRIC TOOL CORPORATION, Brookfield, WI (US)

(72) Inventor: Nathan T. Larsen, Wauwatosa, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/506,401

(22) Filed: Nov. 10, 2023

(65) Prior Publication Data

US 2024/0075606 A1 Mar. 7, 2024

Related U.S. Application Data

(60) Continuation of application No. 17/962,737, filed on Oct. 10, 2022, now Pat. No. 11,839,963, which is a (Continued)

(51) Int. Cl.
*B25F 5/00* (2006.01)
*B25F 5/02* (2006.01)

(52) U.S. Cl.
CPC ................ *B25F 5/001* (2013.01); *B25F 5/02* (2013.01)

(58) Field of Classification Search
CPC .................................. B25F 5/001; B25F 5/02
See application file for complete search history.

(56) References Cited

U.S. PATENT DOCUMENTS 4,756,216 A * 7/1988 Lo .......................... B25B 21/00 81/473
5,014,793 A * 5/1991 Germanton ............... H02P 1/18 81/473

(Continued)

FOREIGN PATENT DOCUMENTS

DE 3316111 A1 11/1983
DE 3311421 A1 10/1984

(Continued)

OTHER PUBLICATIONS

International Search Report and Written Opinion for Application No. PCT/US209/052340 dated Jan. 15, 2020 (10 pages).

(Continued)

*Primary Examiner* — Lucas E. A. Palmer
(74) *Attorney, Agent, or Firm* — Michael Best & Friedrich LLP

(57) ABSTRACT

Power tool methods and systems are provided for controlling an operating mode of the power tool. A power tool includes a housing having a handle portion and a top portion. An input control device is located on the top portion of the housing for changing an operational mode of the power tool. The plurality of operational modes include at least a forward mode and a reverse mode. A controller includes an electronic processor and a memory storing instructions that when executed by the electronic processor configure the controller to receive a mode signal from the input control device indicating the selected one of the plurality of operational modes and operate the motor responsive to the mode signal.

20 Claims, 7 Drawing Sheets

Related U.S. Application Data division of application No. 16/578,633, filed on Sep. 23, 2019, now Pat. No. 11,498,197.

(60) Provisional application No. 62/735,416, filed on Sep. 24, 2018.

(56) References Cited

U.S. PATENT DOCUMENTS

| | | | | |
|---|---|---|---|---|
| 5,842,527 | A | 12/1998 | Arakawa et al. | |
| 7,282,818 | B2 * | 10/2007 | Kovarik | B25F 5/021 307/326 |
| 7,306,048 | B2 | 12/2007 | Yamazaki | |
| 7,325,624 | B2 | 2/2008 | Yamazaki | |
| 7,398,834 | B2 | 7/2008 | Jung et al. | |
| RE40,643 | E | 2/2009 | Stirm | |
| 7,717,191 | B2 * | 5/2010 | Trautner | B25D 16/006 173/90 |
| 7,896,097 | B2 | 3/2011 | Teng | |
| 8,760,102 | B2 | 6/2014 | Hirabayashi | |
| 9,205,547 | B2 | 12/2015 | Hirabayashi et al. | |
| 9,630,307 | B2 | 4/2017 | Ludy et al. | |
| 9,707,671 | B2 | 7/2017 | Shi | |
| 10,391,599 | B2 * | 8/2019 | Yoshida | B27B 9/00 |
| 2003/0196824 | A1 * | 10/2003 | Gass | B23B 45/008 173/131 |
| 2004/0140781 | A1 | 7/2004 | Craven et al. | |
| 2007/0120527 | A1 * | 5/2007 | Roehm | H02J 7/0044 320/114 |
| 2007/0256914 | A1 * | 11/2007 | Lohr | B25B 23/18 200/5 A |
| 2013/0186666 | A1 * | 7/2013 | Yoshino | B25B 23/14 173/176 |
| 2013/0284480 | A1 * | 10/2013 | Horie | B23B 45/02 173/217 |
| 2013/0292147 | A1 * | 11/2013 | Mergener | B25B 21/00 173/20 |
| 2013/0333910 | A1 | 12/2013 | Tanimoto et al. | |
| 2014/0056660 | A1 * | 2/2014 | Eshleman | B23B 51/009 408/9 |
| 2016/0107303 | A1 | 4/2016 | Roberts | |
| 2016/0129578 | A1 * | 5/2016 | Sprenger | B25F 5/001 173/1 |
| 2016/0158929 | A1 | 6/2016 | Brennenstuhl et al. | |
| 2016/0354889 | A1 * | 12/2016 | Ely | B23Q 17/2404 |
| 2017/0133965 | A1 * | 5/2017 | Ichikawa | B25F 5/00 |
| 2017/0348835 | A1 * | 12/2017 | Skelly | B25B 23/0078 |
| 2018/0133879 | A1 | 5/2018 | Hecht | |
| 2018/0250802 | A1 | 9/2018 | Tida et al. | |

FOREIGN PATENT DOCUMENTS

| | | | |
|---|---|---|---|
| DE | 10337260 | A1 | 3/2005 |
| DE | 102012220423 | A1 | 5/2014 |
| EP | 0659525 | A2 | 6/1995 |
| EP | 3222389 | A1 | 9/2017 |
| JP | 2008055563 | A | 3/2008 |
| WO | 2017102519 | A1 | 6/2017 |
| WO | 2017102531 | A1 | 6/2017 |

OTHER PUBLICATIONS

Extended European Search Report for Application No. 19866669.5 dated May 27, 2022 (8 pages).

* cited by examiner

POWER TOOL INCLUDING INPUT CONTROL DEVICE ON TOP PORTION OF HOUSING

RELATED APPLICATIONS

This application is a continuation of U.S. patent application Ser. No. 17/962,737, filed Oct. 10, 2022, which is a division of U.S. patent application Ser. No. 16/578,633, filed Sep. 23, 2019, which claims the benefit of U.S. Provisional Patent Application No. 62/735,416, filed Sep. 24, 2018, the entire content of each of which is hereby incorporated by reference.

FIELD

The present disclosure relates to power tools. More specifically, the present disclosure relates to a power tool including an input control device on a top portion of a housing.

BACKGROUND

Some electric power tools are actuated by a user engaging a trigger. A switch may be located near the trigger to change the operating mode of the power tool. For example, the switch may have a forward position, a reverse position, and a lock position. When the switch is in the forward position, a user actuation of the trigger causes an output spindle of the power tool to operate in a forward direction. When the switch is in the reverse position, a user actuation of the trigger causes an output spindle of the power tool to operate in a reverse direction. When the switch is in the lock position, a user actuation of the trigger has no effect. The positioning of the switch near the trigger increases the size of the handle portion of the power tool and may lead to inadvertent changes to the switch position when the user engages the trigger.

SUMMARY

In one embodiment, a power tool is provided including a housing having a handle portion and a motor housing portion, and a motor within the motor housing portion. The power tool further includes an input control device and a controller. The input control device is located on a top portion of the motor housing portion remote from the handle portion and configured to generate a mode signal in response to actuation of the input control device. The controller includes an electronic processor and a memory storing instructions that, when executed by the electronic processor, configure the controller to receive the mode signal, and to sequentially switch among a plurality of operational modes of the power tool responsive to the mode signal to select one of the plurality of operational modes. The plurality of operational modes includes at least a forward mode and a reverse mode. The controller is further configured to operate the motor according to the selected one of the plurality of operational modes.

In one embodiment, a method for changing an operational mode of a power tool is provided. The power tool includes a housing having a handle portion and a motor housing portion. The method includes receiving, at a controller of the power tool, a mode signal from an input control device positioned on a top portion of the motor housing portion. The top portion is a side of the motor housing portion opposite the handle portion of the housing. The method further includes selecting one of a plurality of operational modes of the power tool in the controller responsive to the mode signal. The plurality of operational modes include at least a forward mode and a reverse mode. The method further includes operating a motor of the power tool by the controller according to the selected one of the plurality of operational modes.

In one embodiment, a power tool includes a housing having a handle portion and a motor housing portion, the handle portion extending away from a bottom side of motor housing portion. The power tool further includes a motor within the motor housing portion, and an input control device located on a top portion of the motor housing portion. The input control device is configured to generate a mode signal in response to actuation of the input control device. The power tool further includes a controller including an electronic processor and a memory storing instructions that, when executed by the electronic processor, configure the controller to receive a mode signal from the input control device indicating a selected one of a plurality of operational modes of the power tool. The plurality of operational modes of the power tool including at least a forward mode and a reverse mode. The controller is further configured to operate the motor according to the selected one of the plurality of operational modes of the power tool responsive to the mode signal.

In some embodiments of the power tools and method, the plurality of operational modes further includes a power tool lock mode of operation.

In some embodiments of the power tools and method, the input control device is further configured to receive a plurality of actuations, and to generate the mode signal responsive to each of the plurality of actuations. Additionally, the controller is further configured to receive the mode signal from the input control device upon each actuation of the input control device, and to sequentially switch among each of the plurality of operational modes responsive to each mode signal received from the input control device.

In some embodiments of the power tools and method, a trigger is positioned on the handle portion of the housing on a side of the motor housing portion opposite the input control device.

In some embodiments of the power tools and method, the controller is configured to receive a trigger signal responsive to an actuation of the trigger and operate the motor according to the selected one of the plurality of operational modes and the trigger signal.

In some embodiments of the power tools and method, an output spindle extends from the motor housing portion, and the controller is configured to receive a trigger signal responsive to an actuation of the trigger and operate the motor to control a rotation direction of the output spindle based on the trigger signal and the selected one of the plurality of operational modes.

In some embodiments of the power tools and method, an indicator is provided on the top portion of the motor housing portion, and the controller is further configured to illuminate the indicator to indicate the selected one of the plurality of operational modes.

Other aspects of the embodiments will become apparent by consideration of the detailed description and accompanying drawings.

DETAILED DESCRIPTION

Figure 1:
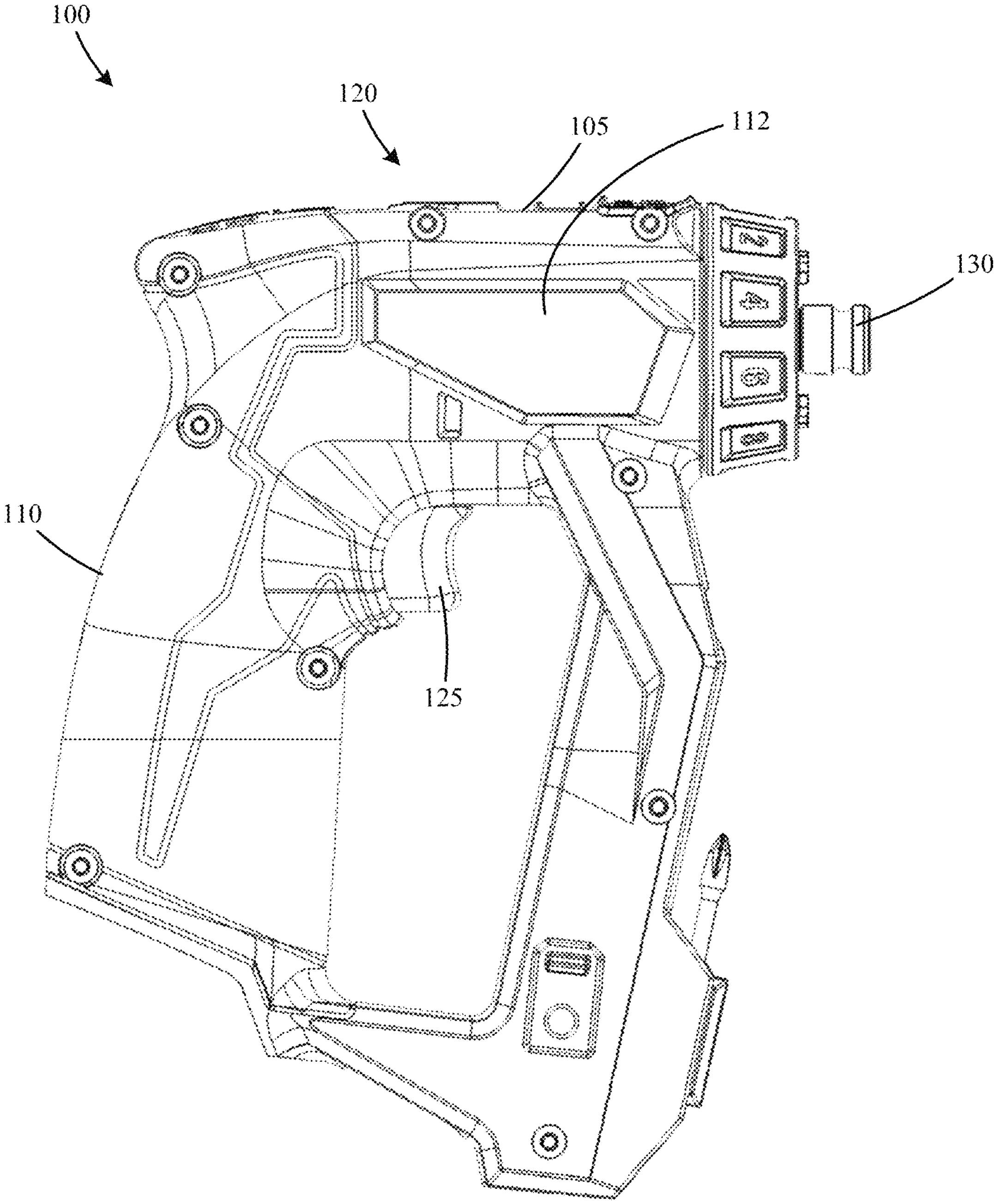
FIG. 1 is a side view of a power tool according to embodiments described herein.
Figure 2:
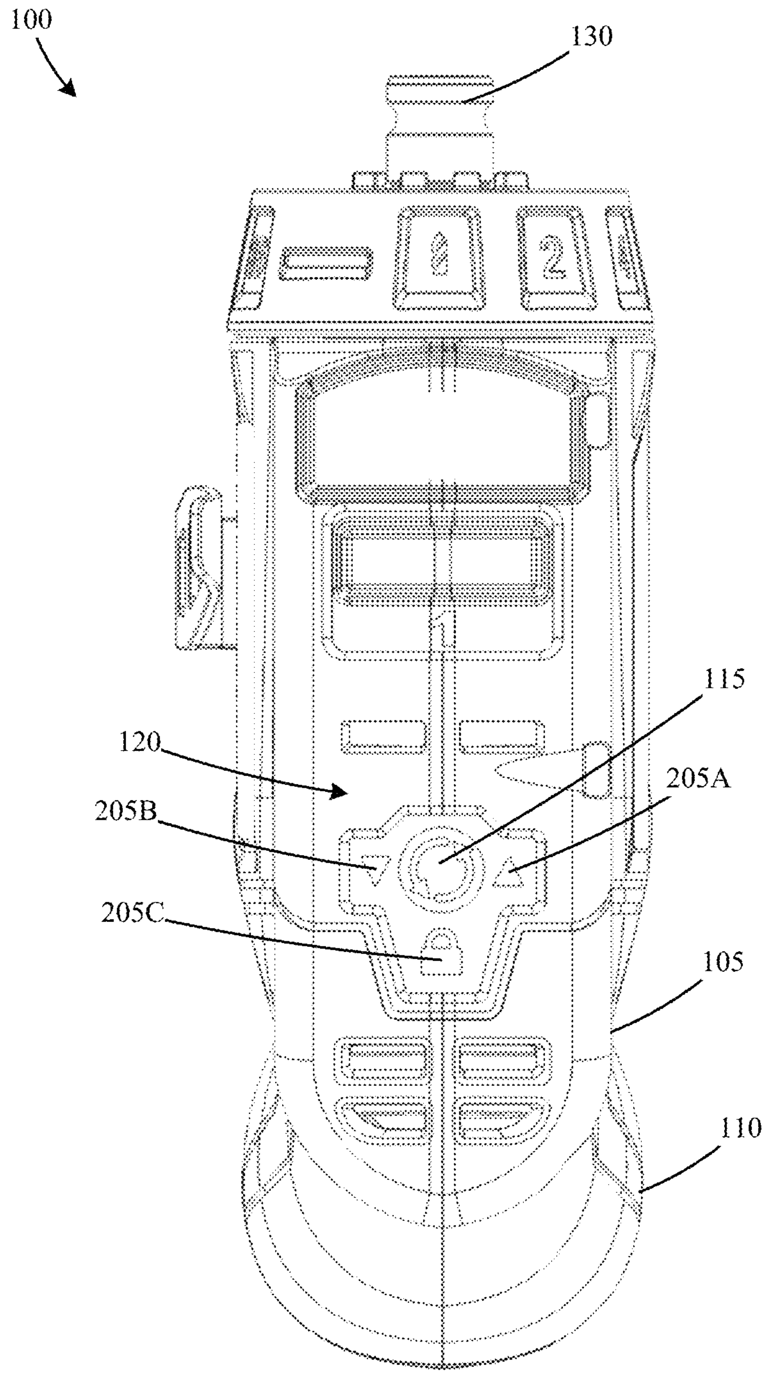
FIG. 2 is a top view of the power tool of FIG. 1.
Figure 3:
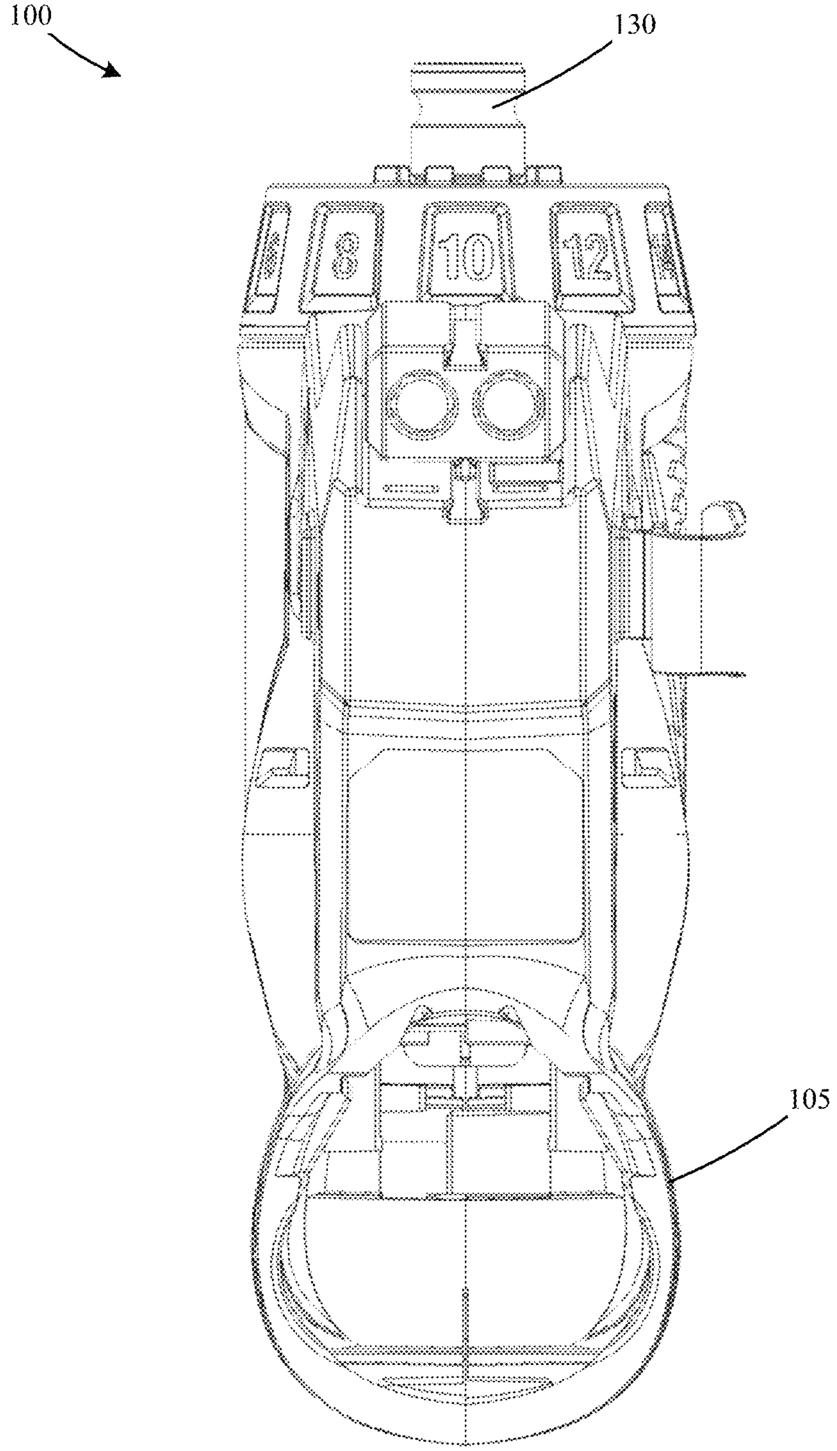
FIG. 3 is a bottom view of the power tool of FIG. 1.
Figure 4:
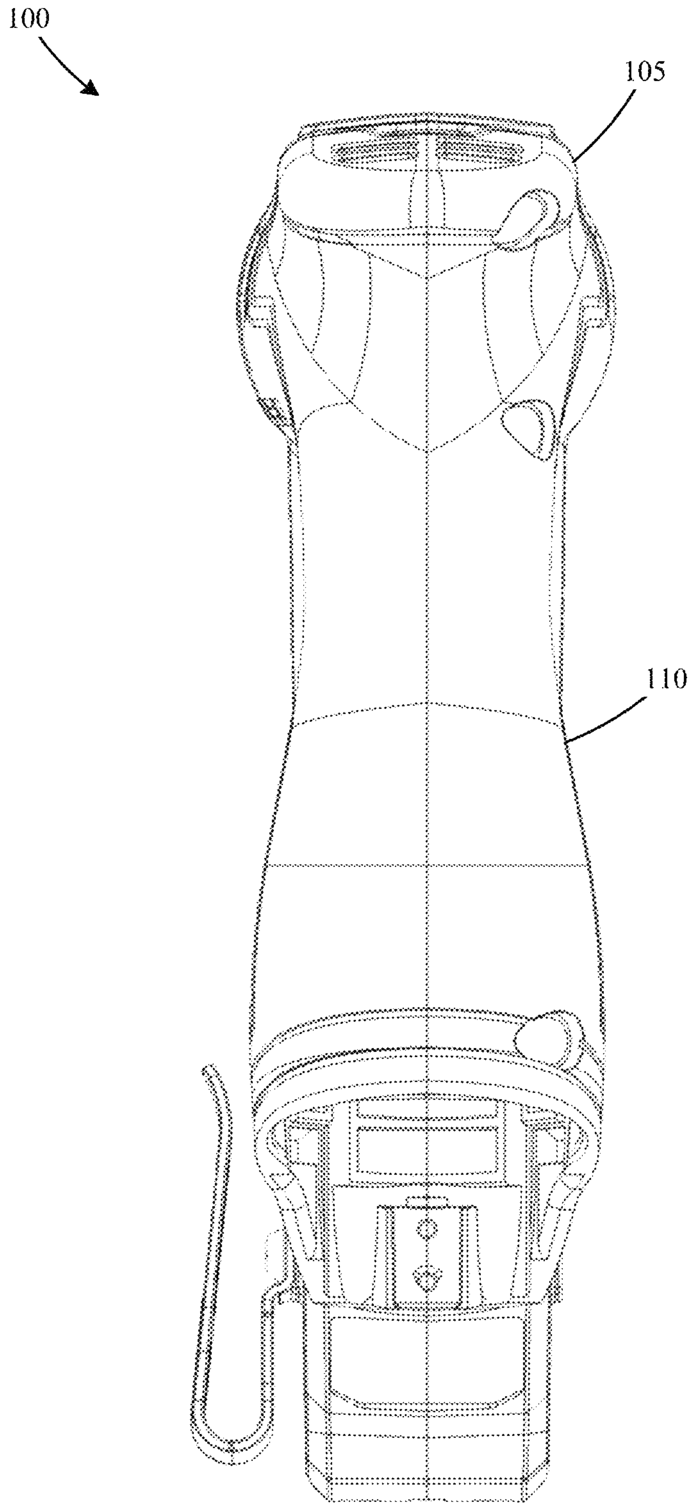
FIG. 4 is a rear view of the power tool of FIG. 1.
Figure 5:
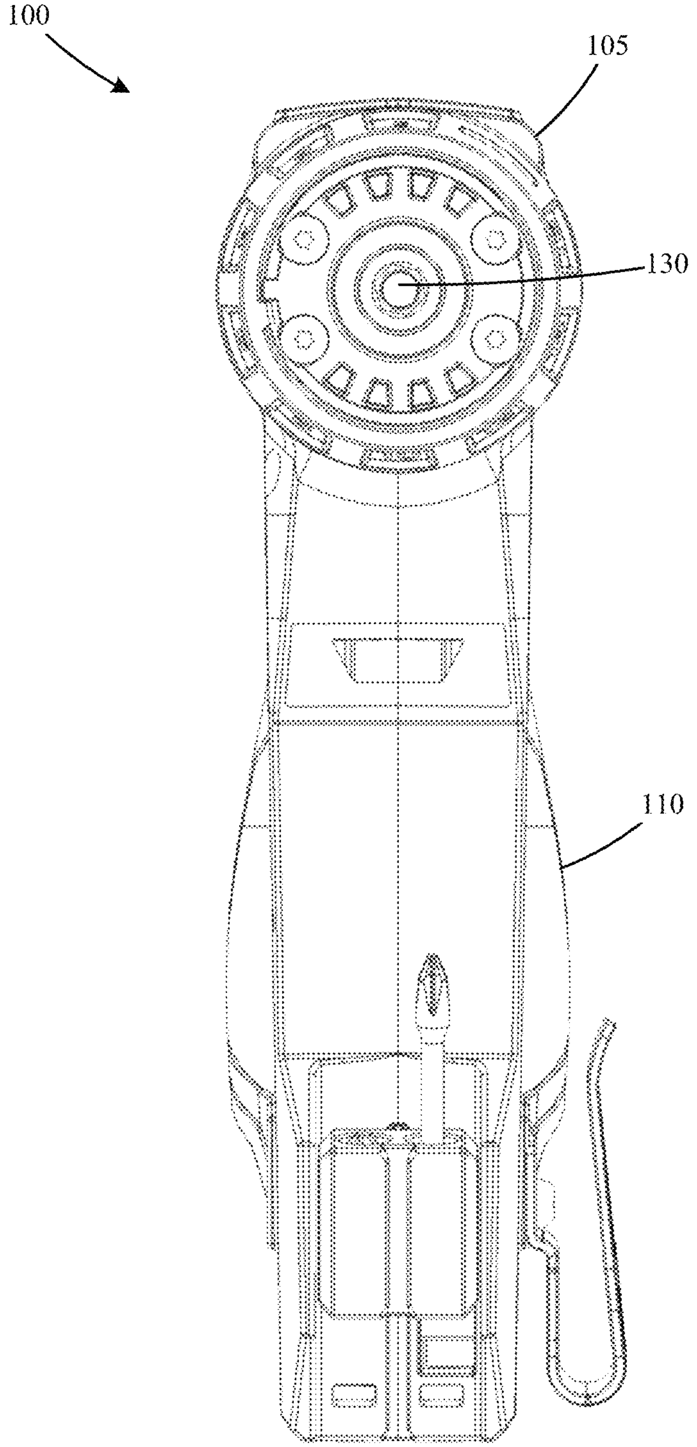
FIG. 5 is a front view of the power tool of FIG. 1.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

FIGS. 1-5 illustrate a power tool 100 that includes a housing 105. The housing 105 includes a handle portion 110, a motor housing portion 112, and an input control device 115. The motor housing portion 112 houses a motor therein. The handle portion 110 extends away from the motor housing portion 112. The input control device 115 is, for example, a button or a switch that is configured to control an operational mode of the power tool 100. The input control device 115 is located on a top portion 120 of the housing 105. More particularly, as illustrated, the input control device 115 is positioned on a top portion of the motor housing portion 112, away from the handle portion 110. For example, the illustrated input control device 115 is on a (top) side of the motor housing portion 112 opposite from a (bottom) side of the motor housing portion from which the handle portion 110 extends. The input control device 115 is located above the handle portion 110, a motor of the power tool 100, a trigger 125 of the power tool 100, an output spindle 130 of the power tool 100, a battery pack for powering the power tool 100, etc. By locating the input control device 115 on the top portion 120 of the housing 105 and remote from or away from the handle portion 110, the handle portion 110 can be made more compact. For example, by locating the input control device 115 on the top portion 120 of the housing 105, a physical lever typically located near a trigger for a power tool can be removed to make the handle portion 110 of the power tool 100 more compact.

The input control device 115, which may also be referred to as a mode selector, generates a mode signal when actuated by a user of the power tool 100. The input control device 115, in some embodiments, includes an electro-mechanical push button that generates a pulse in response to each actuation (e.g., depression). The button may be spring biased such that actuation momentarily depresses the button in a direction of the housing 105 (overcoming the biasing force of the spring) and then the biasing spring returns the button to an extended position when actuation is completed. In some embodiments, the input control device 115 includes a touch switch, such as a capacitance switch. The generated mode signal is configured to control an operational mode of the power tool 100. For example, the input control device 115 is configured to modify the operational mode of the power tool 100 among a motor forward mode of operation, a motor reverse mode of operation, and a locked tool mode of operation.

Figure 6:
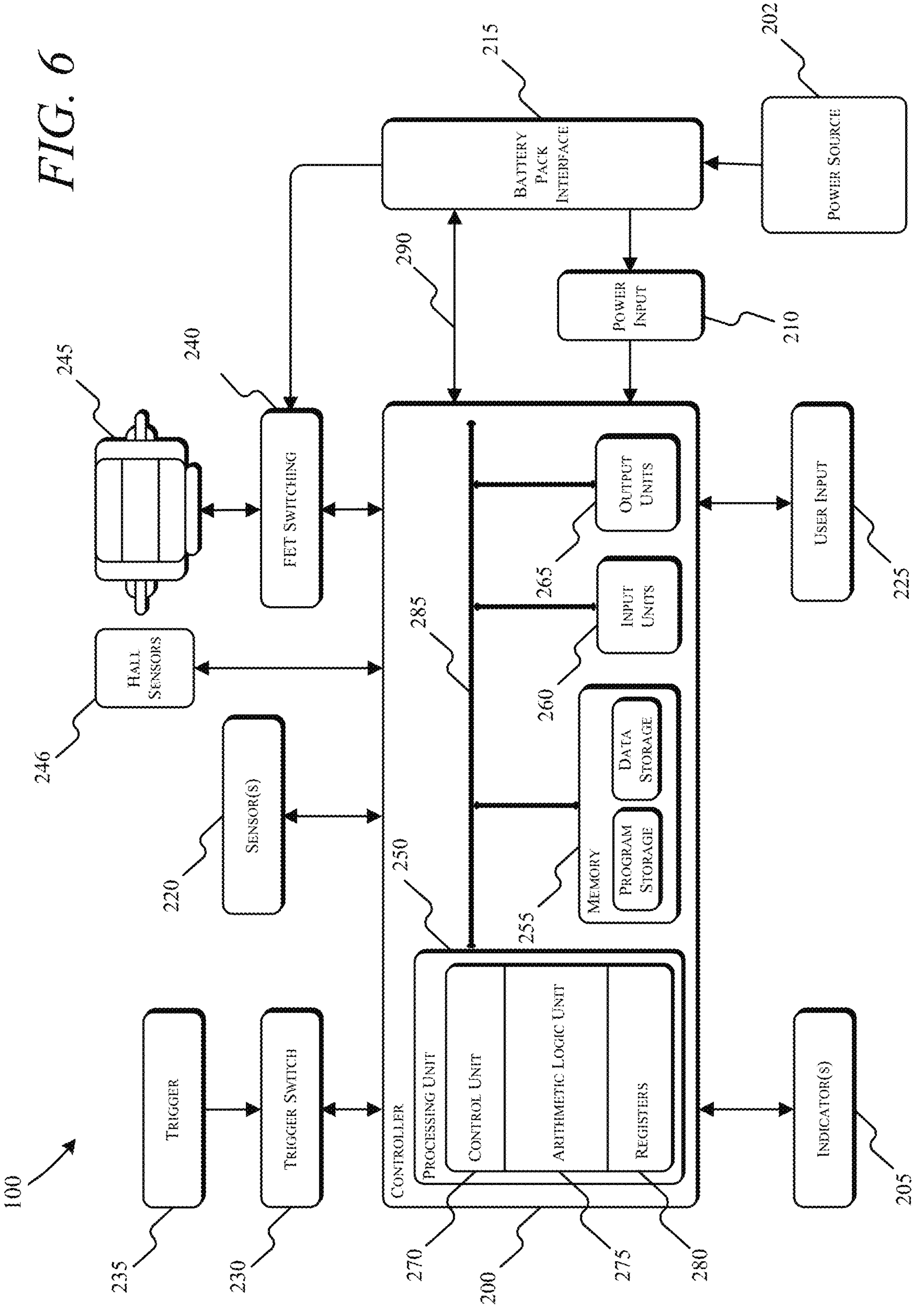
FIG. 6 is a simplified block diagram of the power tool of FIGS. 1-5 according to embodiments described herein.

FIG. 6 illustrates a simplified block diagram of the power tool 100, which includes a controller 200 and a power source 202. The power source 202 provides DC power to the various components of the power tool 100 and may be a power tool battery pack that is rechargeable and uses, for instance, lithium ion cell technology. In some instances, the power source 202 may receive AC power (e.g., 120V/60 Hz) from a tool plug that is coupled to a standard wall outlet, and then filter, condition, and rectify the received power to output DC power.

The controller 200 is electrically and/or communicatively connected to a variety of modules or components of the power tool 100. For example, the illustrated controller 200 is connected to one or more indicators 205, a power input module 210, a battery pack interface 215, one or more sensors 220, a user input module 225, a trigger switch 230 (connected to a trigger 235), and a FET switching bridge 240 (e.g., including one or more switching FETs). The controller 200 includes combinations of hardware and software that are operable to, among other things, control the operation of the power tool 100, activate the one or more indicators 205 (e.g., a light emitting diode (LED)), monitor the operation of the power tool 100, etc.

The controller 200 includes a plurality of electrical and electronic components that provide power, operational control, and protection to the components and modules within the controller 200 and/or the power tool 100. For example, the controller 200 includes, among other things, a processing unit 250 (e.g., a microprocessor, a microcontroller, or another suitable programmable device), a memory 255, input units 260, and output units 265. The processing unit 250 includes, among other things, a control unit 270, an arithmetic logic unit ("ALU") 275, and a plurality of registers 280 (shown as a group of registers in FIG. 6), and is implemented using a known computer architecture (e.g., a modified Harvard architecture, a von Neumann architecture, etc.). The processing unit 250, the memory 255, the input units 260, and the output units 265 as well as the various modules connected to the controller 200 are connected by one or more control and/or data buses (e.g., common bus 285).

The memory 255 is a non-transitory computer readable medium that includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 250 is connected to the memory 255 and executes software instructions that are capable of being stored in a RAM of the memory 255 (e.g., during execution), a ROM of the memory 255 (e.g., on a generally permanent basis), or another non-transitory computer readable medium such as another memory or a disc. Software included in the implementation of the power tool 100 can be stored in the memory 255 of the controller 200. The controller 200 is configured to retrieve from memory and execute, among other things, instructions related to the control of the power tool described herein.

The indicators 205 include, for example, one or more light-emitting diodes ("LED"). The sensors 220 include, for example, one or more current sensors, one or more speed sensors, one or more Hall Effect sensors, one or more temperature sensors, etc. The battery pack interface 215 includes a combination of mechanical and electrical components configured to, and operable for, interfacing (e.g., mechanically, electrically, and communicatively connecting) the power tool 100 with the power source 202. For example, power provided by a battery pack (an example of the power source 202) to the power tool 100 is provided through the battery pack interface 215 to the power input module 210. The power input module 210 includes combinations of active and passive components to regulate or control the power received from the battery pack prior to power being provided to the controller 200. The battery pack interface 215 also supplies power to the FET switching bridge 240 to be switched by the switching FETs to selectively provide power to a motor 245. With reference back to FIG. 1, the motor 245 is housed within the motor housing portion 112 and is configured to drive the output spindle 130, either via a direct drive coupling or a transmission (e.g., including planetary gears). Referring back to FIG. 6, the battery pack interface 215 also includes, for example, a communication line 290 for providing a communication line or link between the controller 200 and a battery pack.

In some embodiments, the tool includes Hall sensors 246 (for example, three Hall sensors) mounted on a printed circuit board (not shown) positioned axially adjacent to the motor 245 at different radial positions (e.g., 120 degrees apart from one another). The Hall sensors 246 output motor feedback information, such as an indication (e.g., a pulse) each time a magnet of the rotor rotates across a face of one of the Hall sensors 246. Based on the motor feedback information from the Hall sensors 246, the controller 200 can determine the position, velocity, and acceleration of the rotor. The controller 200 also receives user controls from user input 225 and the trigger switch 230. In response to the motor feedback information and user controls, the controller 200 transmits control signals to the FET switching bridge 240 to drive the motor 245. In some embodiments, the power tool 100 may be a sensorless power tool that does not include a Hall sensor 246 or other position sensor to detect the position of the rotor. Rather, the rotor position may be detected based on the inductance of the motor 245 or the back emf generated in the motor 245. Although not shown, the controller 200 and other components of the power tool 100 are electrically coupled to the power source 202 such that the power source 202 provides power thereto.

In some embodiments, the FET switching bridge 240 includes a switch bridge having a plurality of high side power switching elements (for example, field effect transistors (FETs)) and a plurality of low side power switching elements (for example, FETs). The controller 200 provides the control signals to control the high side FETs and the low side FETs to drive the motor based on the motor feedback information and user controls, as noted above. For example, in response to detecting a pull of the trigger 235 and the input from the user input module 225, the controller 200 provides the control signals to selectively enable and disable the FETs (e.g., sequentially, in pairs) resulting in power from the power source 202 to be selectively applied to stator coils of the motor 126 to cause rotation of a rotor. More particularly, to drive the motor 245, the controller 200 enables a first high side FET and first low side FET pair (e.g., by providing a voltage at a gate terminal of the FETs) for a first period of time. In response to determining that the rotor of the motor 245 has rotated based on a pulse from the Hall sensors 246, the controller 200 disables the first FET pair, and enables a second high side FET and a second low side FET. In response to determining that the rotor of the motor 126 has rotated based on pulse(s) from the Hall sensors 246, the controller 200 disables the second FET pair, and enables a third high side FET and a third low side FET. In response to determining that the rotor of the motor 245 has rotated based on further pulse(s) from the Hall sensors 246, the controller 200 disables the third FET pair and returns to enable the first high side FET and the first low side FET. This sequence of cyclically enabling pairs of high side FET and a low side FET repeats to drive the motor 245. Further, in some embodiments, the control signals include pulse width modulated (PWM) signals having a duty cycle that is set in proportion to the amount of trigger pull of the trigger 235, to thereby control the speed or torque of the motor 245. In some embodiments, to drive the motor in a first direction (e.g., forward), the sequence of cyclically enabling pairs of the high side FETs and the low side FETs proceeds in a first order (e.g., pair 1, pair 2, pair 3, pair 1, pair 2, etc.), and to drive the motor in a second direction (e.g., reverse), the sequence of cyclically enabling pairs of the high side FETs and the low side FETs proceeds in a second order (e.g., pair 3, pair 2, pair 1, pair 3, pair 2, etc.).

The user input module 225 is operably coupled to the controller 200, for example, to select a forward mode of operation, a reverse mode of operation, or a power tool lock mode of operation for the power tool 100. The user input module 225 includes, for example, the input control device 115 located on the top portion of the housing 105. Each time the input control device 115 is actuated by a user of the power tool 100, the controller 200 receives a mode signal from the use input module 225. Each time the controller 200 receives that mode signal from the user input module 225, the power tool 100 mode of operation is changed. In some implementations, the controller 200 sequentially switches among each of the forward mode of operation, the reverse mode of operation, and the power tool lock mode of operation. For example, the power tool 100 can include a first mode of operation, a second mode of operation, and a third mode of operation. If the power tool 100 is currently operating in the first mode of operation, a mode signal from the user input module 225 will cause the controller 200 to switch to the second mode of operation. If the power tool 100 is currently operating in the second mode of operation, a mode signal from the user input module 225 will cause the controller 200 to switch to the third mode of operation. If the power tool 100 is currently operating in the third mode of operation, a mode signal from the user input module 225 will cause the controller 200 to switch to the first mode of operation.

In some embodiments, the first mode of operation is the forward mode of operation in which the controller 200 controls the FET switching bridge 240 to drive the motor 245 in a first (forward) direction in response to depression of the trigger 235 and the generation of a trigger signal. In some embodiments, the second mode of operation is the reverse mode of operation in which the controller 200 controls the FET switching bridge 240 to drive the motor 245 in a second (reverse) direction, which is opposite the first (forward) direction, in response to depression of the trigger 235. In some embodiments, the third mode of operation is the lock mode of operation in which the controller 200 prevents or suppresses driving of the motor 245 (e.g., by sending control signals to the FET switching bridge 240 or by not sending control signals to the FET switching bridge 240), even when the trigger signal is generated responsive to the trigger 235 being depressed. In other words, in the lock mode of operation, the controller 200 ignores user depression of the trigger 235 and does not drive the motor 245 in response to user depression of the trigger 235.

In some embodiments, the indicators 205 include LEDs to provide an indication of the mode of the power tool 100 as selected by the input control device 115. With reference back to FIG. 2, an LED of the indicators 205 may be associated with each symbol (i.e., forward arrow symbol 205A, reverse arrow symbol 205B, and lock symbol 205C) shown on the input control device 115. The controller 200 illuminates the LED associated with the current mode of operation of the power tool 100 (e.g., the forward arrow 205A is illuminated when in the forward mode of operation, the reverse arrow 205B is illuminating when in the reverse mode of operation, and the lock symbol 205C is illuminated when in the lock mode of operation).

Figure 7:
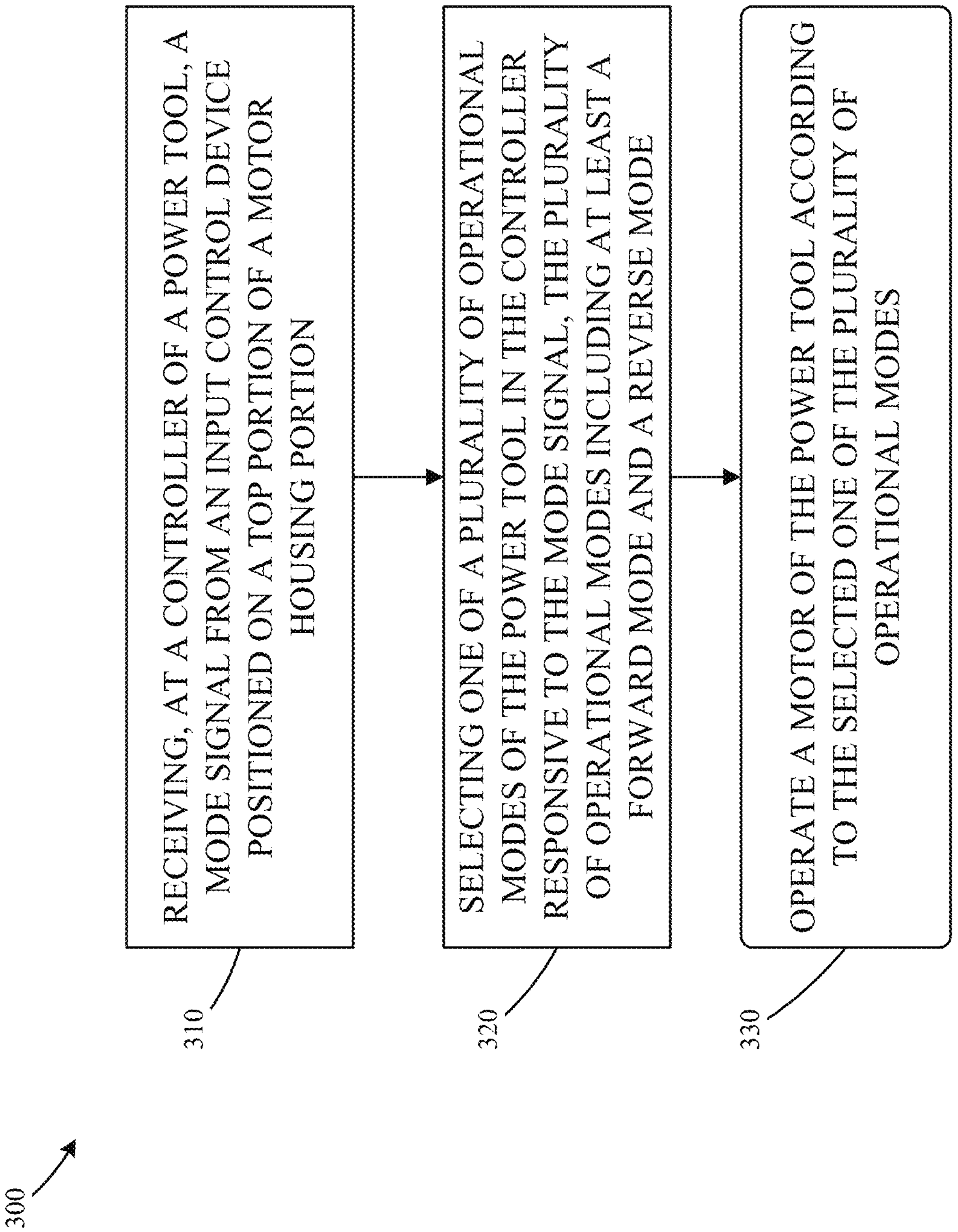
FIG. 7 is flow chart of a method of controlling an operating mode of the power tool of FIGS. 1-6 according to some embodiments described herein.

FIG. 7 is a flow diagram of a method 300 of controlling an operating mode of a power tool, according to some embodiments. The method 300 is described with reference to the power tool 100 described above. However, in some embodiments, the method is implemented using other power tools.

In block 310, a mode signal is received in a controller 200 of the power tool 100 from an input control device 115 positioned on a top portion 120 of a housing 105 of the power tool 100 positioned above a handle portion 110 of the housing 105. For example, each time a user actuates the input control device 115 a mode signal is received by the controller 200. In some embodiments, the mode signal is a pulse signal.

In block 320, the controller 200 selects a different one of a plurality of operational modes of the power tool 100 responsive to the mode signal. In some embodiments, the operational modes include at least a forward mode and a reverse mode. In some embodiments, the operational modes also include a lock mode of operation. Stated another way, in block 320, the controller 200 may change a current operational mode of the tool (selected from the plurality of operational modes) to another operational mode (selected from the plurality of operational modes).

In block 330, the controller 200 operates the motor 245 according to the selected operational mode. For example, in the forward mode of operation, the controller 200 controls the FET switching bridge 240 to drive the motor 245 in a forward direction in response to a depression of the trigger 235 and the generation of a trigger signal by the trigger switch 230. In the reverse mode of operation, the controller 200 controls the FET switching bridge 240 to drive the motor 245 in a reverse direction, which is opposite the forward direction, in response to a depression of the trigger 235 and the generation of a trigger signal by the trigger switch 230. In the lock mode of operation, the controller 200 prevents or suppresses driving of the motor 245 by not sending control signals to the FET switching bridge 240 even when the trigger signal is generated responsive to the trigger 235 being depressed. In other words, in the lock mode of operation, the controller 200 ignores user depression of the trigger 235 and does not drive the motor 245 in response to user depression of the trigger 235.

Operation of the power tool 100 according to the method 300 of FIG. 7 may continue after the tool is operated in block 330 by remaining in block 330 for subsequent actuations of the trigger 235 in the current operational mode, or by looping back to block 310 responsive to another actuation of the input control device 115 and generation of the mode signal. In some embodiments, block 330 is bypassed when the input control device 115 is actuated a subsequent time before the trigger 235 is actuated. Accordingly, at least in some embodiments, the controller 200 may sequentially switch (i.e., cycle) through the operational modes each time an instance of the mode signal is received, and need not first operate the motor according to a selected mode before cycling to a next operational mode. For example, with successive actuations of the input control device 115, the controller 200 may cycle the operational mode from forward, to reverse, to lock, back to forward, to reverse, to lock, and so forth. In other examples, a different order of operational modes is used when cycling (e.g., forward, lock, reverse, forward, lock, reverse, and so forth).

Thus, embodiments described herein provide, among other things, a power tool including an input control device located on a top portion of a housing for changing an operational mode of the power tool.

I claim:

1. A power tool comprising:

a housing having a handle portion and a motor housing portion;

a motor within the motor housing portion;

a mode selector located on a top portion of the motor housing portion remote from the handle portion and configured to generate a mode signal in response to each actuation of the mode selector;

a first indicator on the top portion of the motor housing portion;

a second indicator on the top portion of the motor housing portion; and a controller including an electronic processor and a memory storing instructions that, when executed by the electronic processor, configure the controller to:

receive the mode signal, cycle to a next operational mode of a plurality of operational modes of the power tool responsive to receiving the mode signal to select one of the plurality of operational modes, the plurality of operational modes including a forward mode and a reverse mode, operate the motor according to the selected one of the plurality of operational modes, illuminate the first indicator after receiving a first mode signal from the mode selector to indicate a selection of a first of the forward mode and the reverse mode, illuminate the second indicator after receiving a second mode signal from the mode selector to indicate a selection of a second of the forward mode and the reverse mode, the second mode signal received after the first mode signal, and illuminate the first indicator after receiving a third mode signal from the mode selector to indicate the selection of the first of the forward mode and the reverse mode, the third mode signal received after the second mode signal.

2. The power tool of claim 1, further comprising:

a third indicator on the top portion of the motor housing portion;

wherein the instructions further configure the controller to illuminate the third indicator to indicate a selection of a third mode of the plurality of operational modes.

3. The power tool of claim 1, wherein:

the mode selector is further configured to:

receive a plurality of actuations, and generate the mode signal responsive to each of the plurality of actuations; and the controller is further configured to:

receive the mode signal from the mode selector upon each actuation of the mode selector; and cycle to a next operational mode of the plurality of operational modes responsive to each mode signal received from the input control device.

4. The power tool of claim 1, further comprising:

a trigger positioned on the handle portion of the housing on a side of the motor housing portion opposite the mode selector.

5. The power tool of claim 4, wherein the instructions further configure the controller to receive a trigger signal responsive to an actuation of the trigger and operate the motor according to the selected one of the plurality of operational modes and the trigger signal.

6. The power tool of claim 4, further comprising:

an output spindle extending from the motor housing portion, wherein the instructions further configure the controller to receive a trigger signal responsive to an actuation of the trigger and operate the motor to control a rotation direction of the output spindle based on the trigger signal and the selected one of the plurality of operational modes.

7. The power tool of claim 1, wherein the mode selector includes a spring-biased electro-mechanical push button that generates a pulse in response to each actuation.

8. The power tool of claim 1, wherein the mode selector includes a capacitance touch switch.

9. A power tool comprising:

a housing having a handle portion and a motor housing portion, the handle portion extending away from a bottom side of the motor housing portion;

a motor within the motor housing portion;

an input control device located on a top portion of the motor housing portion and configured to generate a mode signal in response to each actuation of the input control device;

a first indicator on the top portion of the motor housing portion;

a second indicator on the top portion of the motor housing portion; and a controller including an electronic processor and a memory storing instructions that, when executed by the electronic processor, configure the controller to:

receive the mode signal from the input control device, change to a different operational mode of a plurality of operational modes of the power tool responsive to receiving the mode signal to select one of the plurality of operational modes, the plurality of operational modes of the power tool including a forward mode and a reverse mode, operate the motor according to the selected one of the plurality of operational modes of the power tool responsive to the mode signal, illuminate the first indicator after receiving a first mode signal from the mode selector to indicate a selection of a first of the forward mode and the reverse mode, illuminate the second indicator after receiving a second mode signal from the mode selector to indicate a selection of a second of the forward mode and the reverse mode, the second mode signal received after the first mode signal, and illuminate the first indicator after receiving a third mode signal from the mode selector to indicate the selection of the first of the forward mode and the reverse mode, the third mode signal received after the second mode signal.

10. The power tool of claim 9, further comprising:

a third indicator on the top portion of the motor housing portion;

wherein the instructions further configure the controller to illuminate the third indicator to indicate a selection of a third mode of the plurality of operational modes.

11. The power tool of claim 9, wherein:

the input control device is further configured to:

receive a plurality of actuations, and generate the mode signal responsive to each of the plurality of actuations; and the controller is further configured to:

receive the mode signal from the input control device upon each actuation of the input control device; and cycle to a next operational mode of the plurality of operational modes responsive to each mode signal received from the input control device.

12. The power tool of claim 9, further comprising:

a trigger positioned on the handle portion of the housing.

13. The power tool of claim 12, wherein the instructions further configure the controller to receive a trigger signal responsive to an actuation of the trigger and operate the motor according to the selected one of the plurality of operational modes and the trigger signal.

14. The power tool of claim 13, further comprising:

an output spindle extending from the motor housing portion of the housing and coupled to the motor.

15. The power tool of claim 9, wherein the input control device includes a spring-biased electro-mechanical push button that generates a pulse in response to each actuation.

16. The power tool of claim 9, wherein the input control device includes a capacitance touch switch.

17. A power tool comprising:

a housing;

a motor within the housing;

an input control device located on a top portion of the housing and configured to generate a mode signal in response to an actuation of the input control device;

a first indicator on the top portion of the motor housing portion;

a second indicator on the top portion of the motor housing portion; and a controller including an electronic processor and a memory storing instructions that, when executed by the electronic processor, configure the controller to:

receive the mode signal from the input control device, change to a different operational mode of a plurality of operational modes of the power tool responsive to receiving the mode signal to select one of the plurality of operational modes, the plurality of operational modes of the power tool including a forward mode and a reverse mode, operate the motor according to the selected one of the plurality of operational modes of the power tool responsive to the mode signal, illuminate the first indicator after receiving a first mode signal from the mode selector to indicate a selection of a first of the forward mode and the reverse mode, illuminate the second indicator after receiving a second mode signal from the mode selector to indicate a selection of a second of the forward mode and the reverse mode, the second mode signal received after the first mode signal, and illuminate the first indicator after receiving a third mode signal from the mode selector to indicate the selection of the first of the forward mode and the reverse mode, the third mode signal received after the second mode signal.

18. The power tool of claim 17, further comprising:

a third indicator on the top portion of the motor housing portion;

wherein the instructions further configure the controller to illuminate the third indicator to indicate a selection of a third mode of the plurality of operational modes.

19. The power tool of claim 18, wherein the third mode is a lock mode for the power tool.

20. The power tool of claim 19, wherein, when in the lock mode, the instructions further configure the controller to prevent operation of the motor.

* * * * *